(12) United States Patent
Beerends et al.

(10) Patent No.: US 9,025,780 B2
(45) Date of Patent: May 5, 2015

(54) METHOD AND SYSTEM FOR DETERMINING A PERCEIVED QUALITY OF AN AUDIO SYSTEM

(75) Inventors: John Gerard Beerends, Hengstdijk (NL); Jeroen van Vugt, The Hague (NL)

(73) Assignees: Koninklijke KPN N.V., The Hague (NL); Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 373 days.

(21) Appl. No.: 13/390,259

(22) PCT Filed: Aug. 9, 2010

(86) PCT No.: PCT/EP2010/061538
§ 371 (c)(1),
(2), (4) Date: Feb. 13, 2012

(87) PCT Pub. No.: WO2011/018428
PCT Pub. Date: Feb. 17, 2011

(65) Prior Publication Data
US 2012/0148057 A1 Jun. 14, 2012

(30) Foreign Application Priority Data

Aug. 14, 2009 (EP) ..................................... 09010500
Mar. 30, 2010 (EP) ..................................... 10158410

(51) Int. Cl.
*H04R 29/00* (2006.01)
*G10L 25/69* (2013.01)
*G10L 21/0208* (2013.01)
*H04M 3/22* (2006.01)

(52) U.S. Cl.
CPC ............. *G10L 25/69* (2013.01); *G10L 21/0208* (2013.01); *H04M 3/2236* (2013.01)

(58) Field of Classification Search
CPC .......... H04R 29/00; G10L 21/00; G06F 15/00
USPC ............... 381/94.1–94.7, 56; 704/200, 200.1, 704/207, 226, 233, 205
See application file for complete search history.

(56) References Cited

U.S. PATENT DOCUMENTS 5,553,193 A * 9/1996 Akagiri ...................... 704/200.1
6,473,733 B1 * 10/2002 McArthur et al. ............ 704/224
(Continued)

FOREIGN PATENT DOCUMENTS

EP 1241663 A1 9/2002
EP 1975924 A1 1/2008
(Continued)

OTHER PUBLICATIONS

"Series P: Telephone Transmission Quality, Telephone Installations, Local Line Networks/Methods for Objective and Subjective Assessment of Quality/Perceptual Evaluation of Speech Quality (PESQ): An Objective Method for End-to-End Speech Quality Assessment of Narrow-Band Telephone Networks and Speech Codecs", ITU-T Recommendation p. 862, Feb. 2001, 30 pages.
(Continued)

*Primary Examiner* — Disler Paul
(74) *Attorney, Agent, or Firm* — McDonnell Boehnen Hulbert & Berghoff LLP

(57) ABSTRACT

The invention relates to a method for determining a quality indicator representing a perceived quality of an output signal of an audio device with respect to a reference signal. Such audio device may for example be a speech processing system. In the method the reference signal and the output signal are processed and compared. The processing includes dividing the reference signal and the output signal into mutually corresponding time frames. The processing further includes scaling the reference signal towards a fixed intensity level. Time frames of the output signal are selected based on measurements performed on the scaled reference signal. Then, a noise contrast parameter is calculated based on the selected time frames of the output signal. A noise suppression is applied on at least one of the reference signal and the output signal based on the noise contrast parameter. Finally, the reference signal and the output signal are perceptually subtracted to form a difference signal, and the quality indicator is derived from the difference signal.

15 Claims, 7 Drawing Sheets

(56) References Cited

U.S. PATENT DOCUMENTS

| | | | |
|---|---|---|---|
| 7,313,517 B2* | 12/2007 | Beerends et al. | 704/200 |
| 7,315,812 B2 | 1/2008 | Beerends | |
| 8,583,423 B2* | 11/2013 | Grancharov | 704/200.1 |
| 2005/0159944 A1 | 7/2005 | Beerends | |
| 2005/0244011 A1* | 11/2005 | Kim | 381/56 |
| 2011/0313758 A1* | 12/2011 | Grancharov | 704/205 |
| 2012/0170760 A1* | 7/2012 | Virolainen et al. | 381/56 |

FOREIGN PATENT DOCUMENTS

| | | |
|---|---|---|
| EP | 1792304 A1 | 8/2008 |
| WO | 2005109404 A2 | 11/2005 |

OTHER PUBLICATIONS

"Series P: Telephone Transmission Quality, Telephone Installations, Local Line Networks/Methods for Objective and Subjective Assessment of Quality/Objective Quality Measurement of Telephone-Band (300-3400 Hz) Speech Codecs", ITU-T Recommendation p. 861, (Feb. 1998), 43 pages.

Beerends, John G. et al., "A Perceptual Audio Quality Measure Based on a Psychoacoustic Sound Representation", J. Audio Eng. Soc., vol. 40, No. 12, 1992, pp. 963-978.

PCT International Search Report and Written Opinion, PCT International Application No. PCT/EP2010/061538 dated Nov. 18, 2010.

European Search Report, European Patent Application No. 09010500.8 dated Jan. 22, 2010.

Beerends, John G. et al., "Perceptual Evaluation of Speech Quality (PESQ) The New ITU Standard for End-to-End Speech Quality Assessment Part II—Psychoacoustic Model", J. Audio Eng. Soc., vol. 50, No. 10, Oct. 2002, pp. 765-778.

Beerends, John G. et al., "Degradation Decomposition of the Perceived Quality of Speech Signals on the Basis of a Perceptual Modeling Approach", J. Audio Eng. Soc., vol. 55, No. 12, Dec. 2007, pp. 1059-1076.

* cited by examiner

METHOD AND SYSTEM FOR DETERMINING A PERCEIVED QUALITY OF AN AUDIO SYSTEM

CROSS REFERENCE TO RELATED APPLICATIONS

The present application is a national stage entry of PCT/EP2010/061538, filed Aug. 9, 2010, and claims priority of EP 09010500.8, filed Aug. 14, 2009 and EP 10158410.0, filed Mar. 30, 2010. The full disclosure of EP 09010500.8, EP 10158410.0, and PCT/EP2010/061538 are incorporated herein by reference.

FIELD OF THE INVENTION

The invention relates to a method for determining a quality indicator representing a perceived quality of an output signal of an audio device, for example a speech processing system, with respect to a reference signal. The invention further relates to a computer program product comprising computer executable code, for example stored on a computer readable medium, adapted to perform, when executed by a processor, such method. Finally, the invention relates to a system for determining a quality indicator representing a perceived quality of an output signal of an audio system with respect to an input signal of the audio system which serves as a reference signal.

BACKGROUND OF THE INVENTION

The quality of an audio device can be determined either subjectively or objectively. Subjective tests are time consuming, expensive, and difficult to reproduce. Therefore, several methods have been developed to measure the quality of an output signal, in particular a speech signal, of an audio device in an objective way. In such methods, the speech quality of an output signal as received from a speech signal processing system is determined by comparison with a reference signal.

A current method that is widely used for this purpose is the method described in ITU-T Recommendation P.862 entitled "Perceptual evaluation of speech quality (PESQ): An objective method for end-to-end speech quality assessment of narrow-band telephone networks and speech codecs". In ITU-T recommendation P.862, the quality of an output signal from a speech signal processing system, which signal is generally distorted, is to be determined. The output signal and a reference signal, for example the input signal of the signal processing system, are mapped on representation signals according to a psycho-physical perception model of the human auditory system. Based on these signals, a differential signal is determined which is representative of a distortion within the output signal as compared to the reference signal. The differential signal is then processed in accordance with a cognitive model, in which certain properties of human hearing perception based on testing have been modeled, to obtain a quality signal that is a measure of the quality of the auditive perception of the output signal.

Generally, objective measurement systems like PESQ interpret noise in terms of a decrease in quality. However, this interpretation is too simplistic. In present-day telecommunications systems, in particular systems using Voice-Over-IP (VOIP) and similar technologies, the impact of noise on speech quality varies in dependence of local signal level. Consequently, PESQ frequently does not provide optimum predictions of the perception of speech signals processed in such telecommunication systems, which are becoming increasingly popular.

SUMMARY OF THE INVENTION

It is desired to have a method of determining the transmission quality of an audio system that provides an improved correlation between the speech quality as determined by objective measurement and speech quality as determined in subjective testing. For this purpose, embodiments of the invention relate to a method for determining a quality indicator representing a perceived quality of an output signal of an audio device, for example a speech processing system, with respect to a reference signal, where the reference signal and the output signal are processed and compared, and the processing includes dividing the reference signal and the output signal into mutually corresponding time frames, wherein the processing further comprises: scaling the reference signal towards a fixed intensity level; selecting time frames of the output signal based on measurements performed on the scaled reference signal; calculating a noise contrast parameter based on the selected time frames of the output signal, the noise contrast parameter being a measure of the noise contrast within the signal; applying a noise suppression of at least one of the reference signal and the output signal in the perceptual loudness domain based on the noise contrast parameter; perceptually subtracting the reference signal and the output signal to form a difference signal and deriving the quality indicator from the difference signal. The quality indicator provides an objective indication of the transmission quality of an audio system that can be used to compare different audio systems with each other. Derivation of the quality indicator can be performed in a way known from PESQ.

Noise contrast relates to the variation of noise level, preferably measured over time. The absolute value of the noise level and the variance of the noise are to be taken into account. The variation of the noise level over time can play a relevant role in determining the noise contrast parameter. FIGS. 6A-6F show schematic graphs of noise level as a function of time to further explain the concept of noise contrast.

FIG. 6A shows an exemplary graph of noise level as a function of time demonstrating the concept of noise contrast. In this example, the mean noise level generally resides around a certain base level, e.g. during time period $T_2$, and occasionally has a higher noise level, e.g. during time period $T_1$. The noise contrast of the signal in FIG. 6A relates to the difference between the high noise level as present during period $T_1$ and the regular noise level as present during period $T_2$. The noise contrast is of influence on the perceived quality of the output signal of an audio device. If such output signal would comprise a noise pattern as shown in FIG. 6A, the presence of the higher noise level parts which exceed the normal noise levels may be experienced as highly disturbing by a listener. In particular a change in the noise level focusses the listener on the noise. Changing noise levels are thus generally experienced as more disturbing than constant noise levels.

The noise contrast may be determined by comparing different parts of the signal with each other. Each part may have a certain length. The influence on the length of the time interval of signal parts used in noise contrast evaluation is demonstrated with reference to the graphs shown in FIGS. 6B, 6C.

FIGS. 6B, 6C show the noise level of two signals. For both signals, the noise is normally distributed. The noise levels of the signals have the same mean noise level, however, the variance of the noise is different. The 3σ-confidence interval of the noise in FIG. 6B is greater than the 3σ-confidence interval shown in FIG. 6C. Note that the regular noise level variation shown within the confidence interval is not likely to occur in reality and is merely used to show that the signal can widely vary within the confidence interval.

In FIGS. 6B, 6C, if the signal parts used to evaluate noise contrast are sufficiently large, for example a time period $T_3$, the average noise level value within these signal parts equals the mean value of the noise level. This value will be found for all signal parts resulting in a noise contrast equal to zero.

However, if the time period of parts used to evaluate the noise contrast is relatively short, for example a length $T_4$ shown in FIGS. 6A, 6B, the average value of the noise level within each part may well differ from the long-term mean noise level value, and from other parts. The noise contrast will then thus be unequal to zero. In such case, the variance of the noise level may have a significant influence on the noise contrast. The noise variance of the signal in FIG. 6B is greater than the noise variance of the signal in FIG. 6C. Due to the wider spread of noise level values in the signal of FIG. 6B, the difference between the average noise level within a selected short time period and the longer term mean noise level will generally be greater than such difference obtained during a similar evaluation of the signal shown in FIG. 6C. Consequently, the noise contrast of the signal in FIG. 6B will be greater than the noise contrast of the signal in FIG. 6C if short time periods are used. The noise contrast as described with reference to FIGS. 6B, 6C is less indicative for disturbance experienced by a listener. Selection of a sufficiently long time period for evaluation of noise contrast is therefore preferred.

In general, a noise contrast parameter can be defined as a measure of the noise contrast within a portion of the signal. More particularly, the noise contrast parameter is a measure of noise level variation between selected parts within the output signal, for example selected time frames. The selection of the signal parts may be based on the psychophysical perception model of the human auditory system. For example, the selection of signal parts for measurement of noise levels and calculation of a noise contrast parameter may keep in mind that noise level variations may be more important than the measured absolute noise level. This encompasses the situation in which listeners consider background noise level variations as more disturbing than noise with a slightly higher average noise level having less variations. Such preferences have not yet been included in current methods to determine the perceived quality of the transmission properties of an audio device, such as PESQ.

FIGS. 6D-6F further demonstrate considerations that may be taken into account for calculating a noise contrast parameter based on noise levels measured in different parts of a signal.

FIG. 6D depicts the noise level variation of two signals, i.e. signal I and signal II, as a function of time. Over the entire time period shown, the noise level of signal I is greater than the noise level of signal II. However, the noise contrast of both signals is the same.

The noise contrast parameter may be a measure of the noise contrast where the absolute value of the noise level is taken into account or where only the absolute difference in noise levels is taken into account. The noise level variations for signal II are larger in proportion to the absolute noise level. The noise contrast parameter may be calculated to take this into account, so that the noise contrast parameter of signal II may therefore be greater than the noise contrast parameter of signal I. The noise contrast parameter may now be construed to be more susceptible to noise contrast at lower noise levels than to noise contrast at higher noise levels by using absolute noise levels in the calculation. The use of this type of measure can be beneficial for improving the determining of the perceived quality of an audio signal, as listeners are typically more sensitive to noise level variations at low noise levels than similar noise level variations at high noise levels. Furthermore a single rapid change in a noise level may focus the listener on the disturbing background noise and thus may lead to a bigger impact of this background noise level on the perceived overall speech quality.

The noise contrast parameter may further be defined such that it is different for different types of noise level variations as will be illustrated with reference to FIGS. 6E, 6F. In these figures, only the mean noise level of the signal is shown.

FIG. 6E shows a graph of noise level as a function of time where the noise level starts at a high noise level and remains at that level over a time period $T_5$. The noise level then gradually drops during a time period $T_6$ towards a lower noise level and remains at this level during time period $T_5$.

FIG. 6F shows a graph of noise level as a function of time where the noise level starts at the low noise level and remains at that level over a time period $T_5$. The noise level then rises time period $T_6$, and remains at the higher noise level over a time period $T_5$.

During the time interval shown, i.e. $2 \times T_5 + T_6$, the average noise levels for the signals shown in FIGS. 6E, 6F are the same. However, even if the average noise level is the same, the perception of the noise level may be different for noise levels that are increasing over time in contrast to noise levels that are decreasing over time. In particular, if the time interval shown represents a time interval in which there is no speech, an increase of noise during such silent period may be experienced as more disturbing than a decrease of noise.

The noise contrast parameter may now be defined in such a way that this perceptual aspect is taken into account. For example, the noise contrast parameter may be defined such that signal parts at a later time within a time interval that is evaluated are given more weight than earlier signal parts within the time interval. In case of the situations depicted in FIGS. 6E, 6F, the noise contrast parameter may be defined by dividing the noise level measured in the time period $T_5$ before gradual change of the noise level over the noise level measured in the time period $T_5$ after that gradual change. In such case, the noise contrast parameter of the noise level variation shown in FIG. 6E is smaller than 1, while the noise contrast parameter of the noise level variation shown in FIG. 6F is greater than 1.

The noise contrast parameter is thus used to further address subjective perception of noise. Using the noise contrast within a signal improves the correlation between speech quality obtained by objective measurement and speech quality as determined in subjective testing.

In an embodiment, deriving the noise contrast parameter comprises: taking a first selected time frame within the output signal; taking a second selected time frame within the output signal; and determining the noise contrast parameter based on the first selected time frame and the second selected time frame. In a further embodiment, determining the noise contrast parameter may comprise: determining a fraction by dividing the intensity value of the first selected time frame by the intensity value of the second selected time frame; compressing the fraction by using a power law with a predetermined compression coefficient so as to obtain the noise contrast parameter. The noise contrast parameter may be set to a predetermined fixed value if the compressed fraction is below the predetermined fixed value.

In an embodiment, applying the noise suppression on the reference signal comprises: calculating a reference average noise spectral density over a number of time frames having a detected intensity level below a threshold value; determining a reference noise suppression factor based on an optimized correlation between objective and subjective quality assessment information; and calculating a desired noise level based on the reference noise suppression factor and the reference average noise spectral density. The reference noise suppression performed on the scaled reference signal may thus be arranged to suppress noise up to a noise level that is considered to be a desirable low noise level. Such desirable low noise level may be determined in subjective quality assessment experiments.

In an embodiment, applying the noise suppression on the output signal comprises: calculating an average output noise spectral density over a number of time frames corresponding to time frames within the reference signal having a detected intensity level below a threshold value; determining a low noise level constant based on an optimized correlation between objective and subjective quality assessment information; determining an output noise suppression factor based on an optimized correlation between objective and subjective quality assessment information; and calculating a noise level representative of disturbance in the output signal by using the low noise level constant, the output noise suppression factor and the average output noise spectral density. The output noise suppression performed on the output signal may then be arranged to suppress noise up to a noise level representative of the disturbance. The output noise suppression may be frequency dependent.

In an embodiment, the processing further comprises: transforming the reference signal and the output signal from the time domain towards the time-frequency domain; deriving a reference pitch power density function from the reference signal and deriving an output pitch power density function from the output signal; locally scaling the reference pitch power density function to obtain a locally scaled reference pitch power density function; partially compensating either the output pitch power density function or the locally scaled reference pitch power density function with respect to frequency; and deriving a reference loudness density function and an output loudness density function.

In a further embodiment, the processing further comprises: scaling the intensity of the reference pitch power density function from the fixed intensity level towards an intensity level related to output pitch power density function to obtain an intensity level difference between the pitch power density functions that allows for quantification of the impact of intensity level on the perceived quality; scaling the loudness of the output loudness density function towards a fixed loudness level in the perceptual loudness domain; and scaling the loudness of the reference loudness density function from a loudness level corresponding to the output related intensity level towards a loudness level related to the loudness level of the output loudness density function in the perceptual loudness domain, to obtain a loudness level difference between the reference loudness density function and the output loudness density function that allows for quantification of the impact of loudness on the perceived quality of the output signal.

In some embodiments, the invention further relates to a method for determining two quality indicators representing a perceived quality of an output signal of an audio device, for example a speech processing system, with respect to a reference signal, the method comprising: performing any one of abovementioned method embodiments for determining a first quality indicator representing quality with respect to overall degradation; and performing any one of abovementioned method embodiments for determining a second quality indicator, the second quality indicator representing quality with respect to degradations added in comparison to the reference signal. In a further embodiment, determining a first quality indicator comprises identifying a sequence of time frames within the scaled reference signal having a detected intensity level below a first threshold value, and determining a second quality indicator comprises identifying a sequence of time frames within the scaled reference signal having a detected intensity level below a second threshold value, the second threshold value being greater than the first threshold value.

In an embodiment, selecting time frames comprises selecting time frames of the output signal corresponding to time frames of the scaled reference signal that satisfy a predetermined condition. Such predetermined condition may include that the time frame of the scaled reference signal, a silent frame, has an intensity level value below a threshold value. In a further embodiment, the predetermined condition further includes that the time frame of the scaled reference signal is part of a series of consecutive silent frames, a silent interval. The use of silent frames and/or silent intervals improves the reliability of the noise contrast parameter, and thus allows for further improvement of the correlation between the speech quality as determined by objective measurement and speech quality as determined in subjective testing.

In embodiments, the invention relates to a computer program product comprising computer executable code, for example stored on a computer readable medium, adapted to perform, when executed by a processor, any one of abovementioned method embodiments.

Finally, in embodiments, the invention relates to a system for determining a quality indicator representing a perceived quality of an output signal Y(t) of an audio system, for example a speech processing device, with respect to an input signal X(t) of the audio system which serves as a reference signal, the system comprising: a pre-processing device for pre-processing the reference signal and the output signal; a first processing device for processing the reference signal, and a second processing device for processing the output signal to obtain representation signals R(X), R(Y) for the reference signal and the output signal respectively; a differentiation device for combining the representation signals of the reference signal and the output signal so as to obtain a differential signal D; and a modeling device for processing the differential signal to obtain a quality signal Q representing an estimate of the perceptual quality of the speech processing system; wherein the pre-processing device, the first processing device, and the second processing device form a processing system for performing any one of abovementioned method embodiments.

DETAILED DESCRIPTION OF THE DRAWINGS

The following is a description of certain embodiments of the invention, given by way of example only.

Throughout the description, the terms "local" and "global" will be used with respect to an operation performed on a signal. A "local" operation refers to an operation performed on part of the time signal, for example on a single frame. A "global" operation refers to an operation performed on the entire signal.

Throughout the description, the terms "output" and "distorted" may be used in relation to a signal originating from an output of an audio system, like a speech processing device. Throughout the description, the terms "reference" and "original" may be used in relation to a signal offered as an input to the audio system, the signal further being used as a signal with which the output or distorted signal is to be compared.

Figure 1:
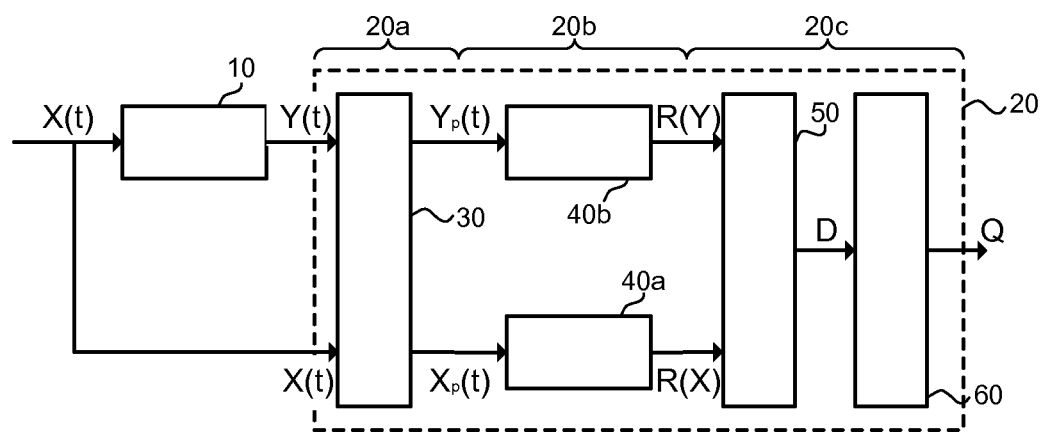
FIG. 1 schematically shows a general set-up including a system for determining a quality indicator representing a perceived quality of an output signal of an audio device with respect to a reference signal.

FIG. 1 schematically shows a general set-up including a system for determining a quality indicator representing a perceived quality of an output signal of an audio device, for example a speech processing system, with respect to a reference signal. The set-up includes an audio system 10 under investigation, e.g. a telecommunications network, network element or speech processing device in a network or mobile station. The set-up also includes a system 20 for measuring the transmission quality of the audio system, hereafter referred to as quality measurement system 20.

The quality measurement system 20 is arranged to receive two input signals. A first input signal is a speech signal X(t) that is directly provided to the quality measurement system 20 (i.e. not provided via the audio system 10), and serves as reference signal. The second input signal is a speech signal Y(t) which corresponds to the speech signal X(t) being affected by the audio system 10. The quality measurement system 20 provides an output quality signal Q which represents an estimate of the perceptual quality of the speech link through the audio system 10.

In this embodiment, the quality measurement system 20 comprises a pre-processing section 20a, a processing section 20b, and a signal combining section 20c to process the two input signals X(t), Y(t) such that the output signal Q can be provided.

The pre-processing section 20a comprises a pre-processing device 30 arranged to perform one or more pre-processing actions such as fixed level scaling and time alignment to obtain pre-processed signals $X_p(t)$ and $Y_p(t)$.

The processing section 20b of the quality measurement system 20 is arranged to map the pre-processed signals onto representation signals according to a psycho-physical perception model of the human auditory system. Pre-processed signal $X_p(t)$ is processed in first processing device 40a to obtain representation signal R(X), while pre-processed signal $Y_p(t)$ is processed in second processing device 40b to obtain representation signal R(Y).

The signal combining section 20c of the quality measurement system 20 is arranged to combine the representation signals R(X), R(Y) to obtain a differential signal D by using a differentiation device 50. Finally, a modeling device 60 processes the differential signal D in accordance with a model in which certain properties of humans have been modeled to obtain the quality signal Q. The human properties, e.g. cognitive properties, may be obtained via subjective listening tests performed with a number of human subjects.

Pre-processing device 30, first processing device 40a, and second processing device 40b may form a processing system that may be used to perform embodiments of the invention as will be explained in more detail later. The processing system or components thereof may take the form of a hardware processor such as an Application Specific Integrated Circuit (ASIC) or a computer device for running computer executable code in the form of software or firmware. The computer device may comprise, e.g. a processor and a memory which is communicatively coupled to the processor. Examples of a memory include, but are not limited to, Read-Only Memory (ROM), Random Access Memory (RAM), Erasable Programmable ROM (EPROM), Electrically Erasable Programmable ROM (EEPROM), and flash memory.

The computer device may further comprise a user interface to enable input of instructions or notifications by external users. Examples of a user interface include, but are not limited to, a mouse, a keyboard, and a touch screen.

The computer device may be arranged to load computer executable code stored on a computer readable medium, e.g. a Compact Disc Read-Only Memory (CD ROM), a Digital Video Disc (DVD) or any other type of known computer-readable data carrier. For this purpose the computer device may comprise a reading unit.

The computer executable code stored on the computer readable medium, after loading of the code into the memory of the computer device, may be adapted to perform embodiments of the invention which will be described later.

Alternatively or additionally, such embodiments of the invention may take the form of a computer program product comprising computer executable code to perform such a method when executed on a computer device. The method may then be performed by a processor of the computer device after loading the computer executable code into a memory of the computer device.

Thus, an objective perceptual measurement method mimics sound perception of subjects in a computer program with the goal to predict the subjectively perceived quality of audio systems, such as speech codecs, telephone links, and mobile handsets. Physical signals of input and output of the device under test are mapped onto psychophysical representations that match as close as possible the internal representations inside the head of a human being. The quality of the device under test is judged on the basis of differences in the internal representation. The best known objective perceptual measurement method presently available is PESQ (Perceptual Evaluation of Speech Quality).

Figure 2:
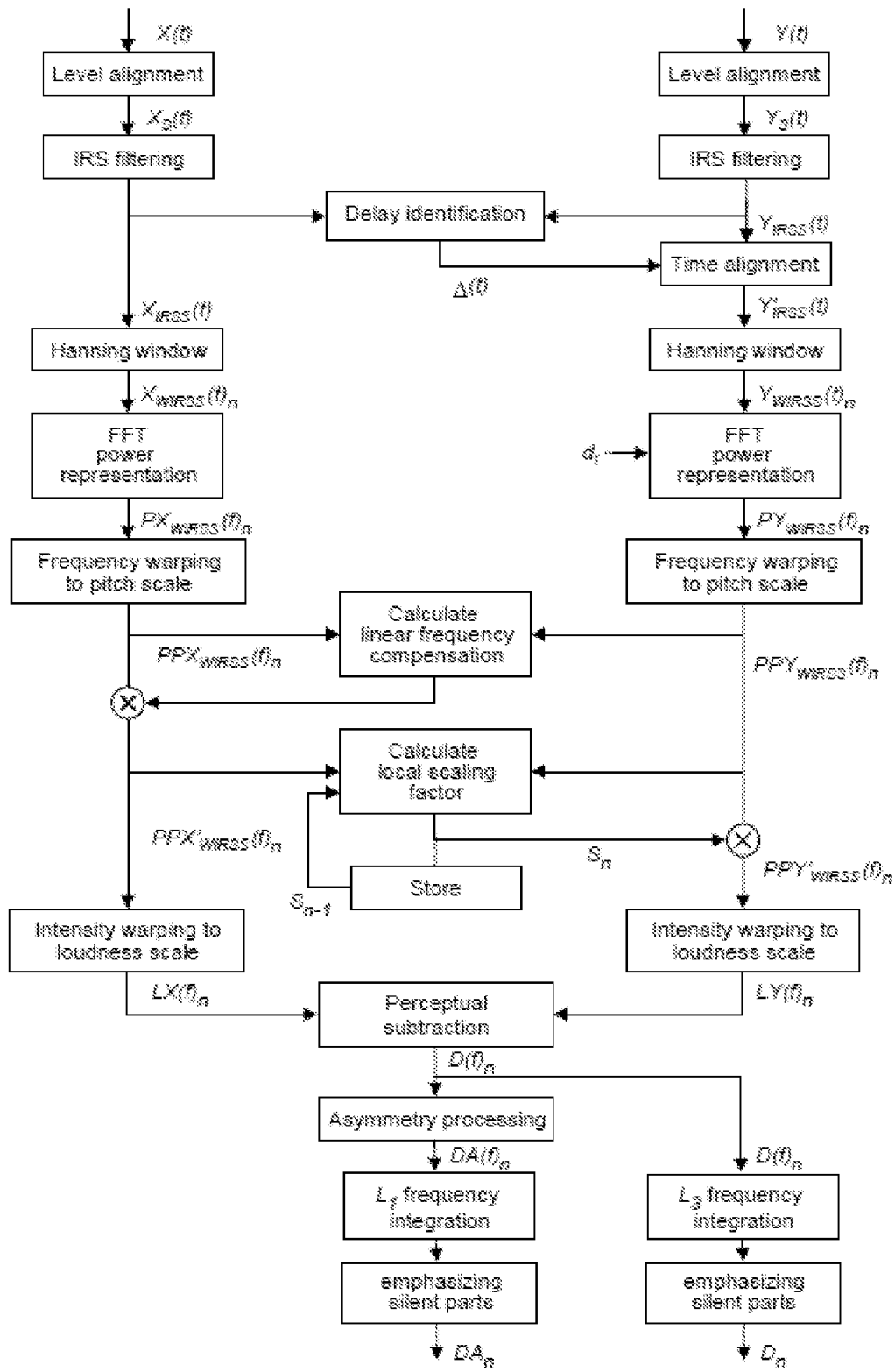
FIG. 2 schematically shows a method determining a quality indicator representing a perceived quality of an output signal of an audio device with respect to a reference signal according to PESQ.

FIG. 2 schematically shows a method determining a quality indicator representing a perceived quality of an output signal of an audio device with respect to a reference signal according to PESQ as laid down in ITU-T Recommendation P.862, hereafter PESQ. PESQ can be used in a set-up as schematically shown in FIG. 1. In PESQ, a reference signal X(t) is compared with a output signal Y(t) that is the result of passing X(t) through an audio system, e.g. a speech processing system like a communication system. The output quality signal of PESQ, also referred to as PESQ score, is a prediction of the perceived quality that would be given to Y(t) by subjects in a subjective listening test. The PESQ score takes the form of a so-called mean opinion score (MOS). For this purpose the PESQ output is mapped onto a MOS-like scale, i.e. a single number in the range of −0.5 to 4.5, although for most cases the output range will be between 1.0 and 4.5, which is the normal range of MOS values found in an Absolute Category Rating (ACR) listening quality experiment.

Pre-processing in PESQ comprises level alignment of both signals X(t), Y(t) to obtain signals $X_s(t)$, $Y_s(t)$ respectively, as well as Intermediate Reference System (IRS) filtering to obtain signals $X_{IRSS}(t)$, $Y_{IRSS}(t)$ respectively. The level alignment involves scaling the intensity towards a fixed level, in PESQ 79 dB SPL. IRS filtering is performed to assure that the method of measuring the transmission quality is relatively insensitive to filtering of a telecommunications system element, e.g. a mobile telephone or the like. Finally, a time delay between reference signal $X_{IRSS}(t)$ and $Y_{IRSS}(t)$ is determined leading to a time-shifted output signal $Y_{IRSS}'(t)$. Comparison between reference signal and output signal is now assumed to take place with respect to the same time.

The human ear performs a time-frequency transformation. In PESQ, this is modeled by performing a short term Fast Fourier Transform (FFT) with a Hanning window on time signals $X_{IRSS}(t)$ and $Y_{IRSS}'(t)$. The Hanning window typically has a size of 32 ms. Adjacent time windows, hereafter referred to as frames, typically overlap by 50%. Phase information is discarded. The sum of the squared real and squared imaginary parts of the complex FFT components, i.e. the power spectra, are used to obtain power representations $PX_{WIRSS}(f)_n$ and $PY_{WIRSS}(f)_n$, where n denotes the frame under consideration. The power representations are divided in frequency bands, hereafter referred to as FFT-bands.

The human auditory system has a finer frequency resolution at low frequencies than at high frequencies. A pitch scale reflects this phenomenon, and for this reason PESQ warps the frequencies to a pitch scale, in this case to a so-called Bark scale. The conversion of the (discrete) frequency axis involves binning of FFT-bands to form Bark-bands, typically 24. The resulting signals are referred to as pitch power densities or pitch power density functions and denoted as $PPX_{WIRSS}(f)_n$ and $PPX_{WIRSS}(f)_n$. The pitch power density functions provide an internal representation that is analogous to the psychophysical representation of audio signals in the human auditory system, taking account of perceptual frequency.

To deal with filtering in the audio system to be tested, the power spectrum of the reference and output pitch power densities are averaged over time. A partial compensation factor is calculated from the ratio of the output spectrum to the reference spectrum. The reference pitch power density $PPX_{WIRSS}(f)_n$ of each frame n is then multiplied with this partial compensation factor to equalize the reference to the output signal. This results in an inversely filtered reference pitch power density $PPX'_{WIRSS}(f)_n$. This partial compensation is used because mild filtering is hardly noticeable while severe filtering can be disturbing to the listener. The compensation is carried out on the reference signal because the output signal is the one that is judged by the subject in an ACR listening experiment.

In order to compensate for short-term gain variations, a local scaling factor is calculated. The local scaling factor is then multiplied with the output pitch power density function $PPY_{WIRSS}(f)_n$ to obtain a locally scaled pitch power density-function $PPY'_{WIRSS}(f)_n$.

After partial compensation for filtering performed on the reference signal and partial compensation for short-term gain variations performed on the output signal, the reference and degraded pitch power densities are transformed to a Sone loudness scale using Zwicker's law. The resulting two-dimensional arrays $LX(f)_n$ and $LY(f)_n$ are referred to as loudness density functions for the reference signal and the output signal respectively. For $LX(f)_n$ this means:

$$LX(f)_n = S_l \left( \frac{P_0(f)}{0.5} \right)^\gamma \cdot \left[ \left( 0.5 + 0.5 \cdot \frac{PPX'_{WIRSS}(f)_n}{P_0(f)} \right)^\gamma - 1 \right] \quad (1)$$

where $P_0(f)$ is the absolute hearing threshold, $S_1$ the loudness scaling factor, and γ, the so-called Zwicker power, has a value of about 0.23. The loudness density functions represent the internal, psychophysical representation of audio signals in the human auditory system taking into account loudness perception.

Then the reference and output loudness density functions $LX(f)_n$, $LY(f)_n$ are subtracted resulting in a difference loudness density function $D(f)_n$ from which a perceived quality measure, or quality indicator, can be derived. Such derivation can be done in a way as described below. Further details may be found in ITU-T Recommendation P.862 which is included by reference herein.

As mentioned above, the reference and output loudness density functions $LX(f)_n$, $LY(f)_n$ are subtracted, which results in a signed difference. When this difference is positive, i.e. $LY(f)_n$ is greater than $LX(f)_n$, components such as noise have been added. On the other hand, when this difference is negative, components have been omitted from the original signal. The difference loudness density function forms a difference array which may be referred to as raw disturbance density. Simultaneously, for each time and frequency the minimum of the reference and output loudness density functions is computed and compressed, e.g. by multiplication with a multiplication factor, in PESQ equal to 0.25. The subsequent minimization and compression results in a two-dimensional array further referred to as mask array. If the raw disturbance density is positive and larger than the respective corresponding value in the mask array, the respective mask array value is subtracted from the raw disturbance density. If the raw disturbance density lies in between plus and minus the magnitude of the mask array value, the disturbance density is set to zero. If the raw disturbance density is more negative than minus the mask array value, the value is added to the raw disturbance density. The result of these comparisons and subsequent modifications results in a disturbance density as a function of time (window number n) and frequency, $D(f)_n$.

If an output signal is distorted by the addition of components, such as noise, the output signal can be decomposed in the input signal and the distortion. However, if the output signal is distorted by removal of components such composition is cannot be easily performed if it can be done at all. This situation is referred to in PESQ as the asymmetry effect and is modeled by calculating an asymmetrical disturbance density DA(f)n per frame by multiplication of the disturbance density $D(f)_n$ with an asymmetry factor. In PESQ, this asymmetry factor equals the ratio of the output and reference pitch power densities raised to the power of 1.2. If the asymmetry factor is less than a predetermined threshold value, in PESQ equal to 3, the asymmetry factor is set to zero. If the asymmetry factor exceeds another predetermined threshold value, in PESQ equal to 12, the factor is clipped at that threshold value. Thus for the asymmetrical disturbance density $DA(f)_n$ only the values unequal to zero in the respective array relate to array cells for which the output pitch power density exceeded the original pitch power density.

The disturbance density $D(f)_n$ and asymmetrical disturbance density $DA(f)_n$ are then integrated, or summed, along the frequency axis using two different so-called Lp-norms and a weighting on frames having a low loudness, that is:

$$D_n = M_n \sqrt[3]{\sum_{f=1,\ldots,NumberofBarkbands} (|D(f)_n|W_f)^3} \quad (3)$$

$$DA_n = M_n \sum_{f=1,\ldots,NumberofBarkbands} (|DA(f)_n|W_f) \quad (4)$$

with $M_n$ a multiplication factor arranged to emphasize disturbances that occur during silences in the input signal, and $W_f$ a series of constants proportional to the width of the Bark bins being used. The aggregated values, $D_n$ and $DA_n$, obtained by equations (3) and (4) are referred to as frame disturbances. The frame disturbances are limited to a maximum value, in PESQ equal to 45. If consecutive frames have a frame disturbance above the threshold, they may be realigned.

Next, frame disturbance values and asymmetrical frame disturbance values are aggregated over intervals of a limited number of frames, in PESQ equal to 20 frames. These intervals have an overlap, typically 50%, and no window function is used. Then the aggregated values over the limited number of frames, for both disturbance and asymmetrical disturbance, are aggregated over the active interval of the speech file to form an average disturbance value and an average asymmetrical disturbance value respectively. The final score, i.e. the quality indicator, is then a linear combination of the average disturbance value and the average asymmetrical disturbance value.

Figure 3:
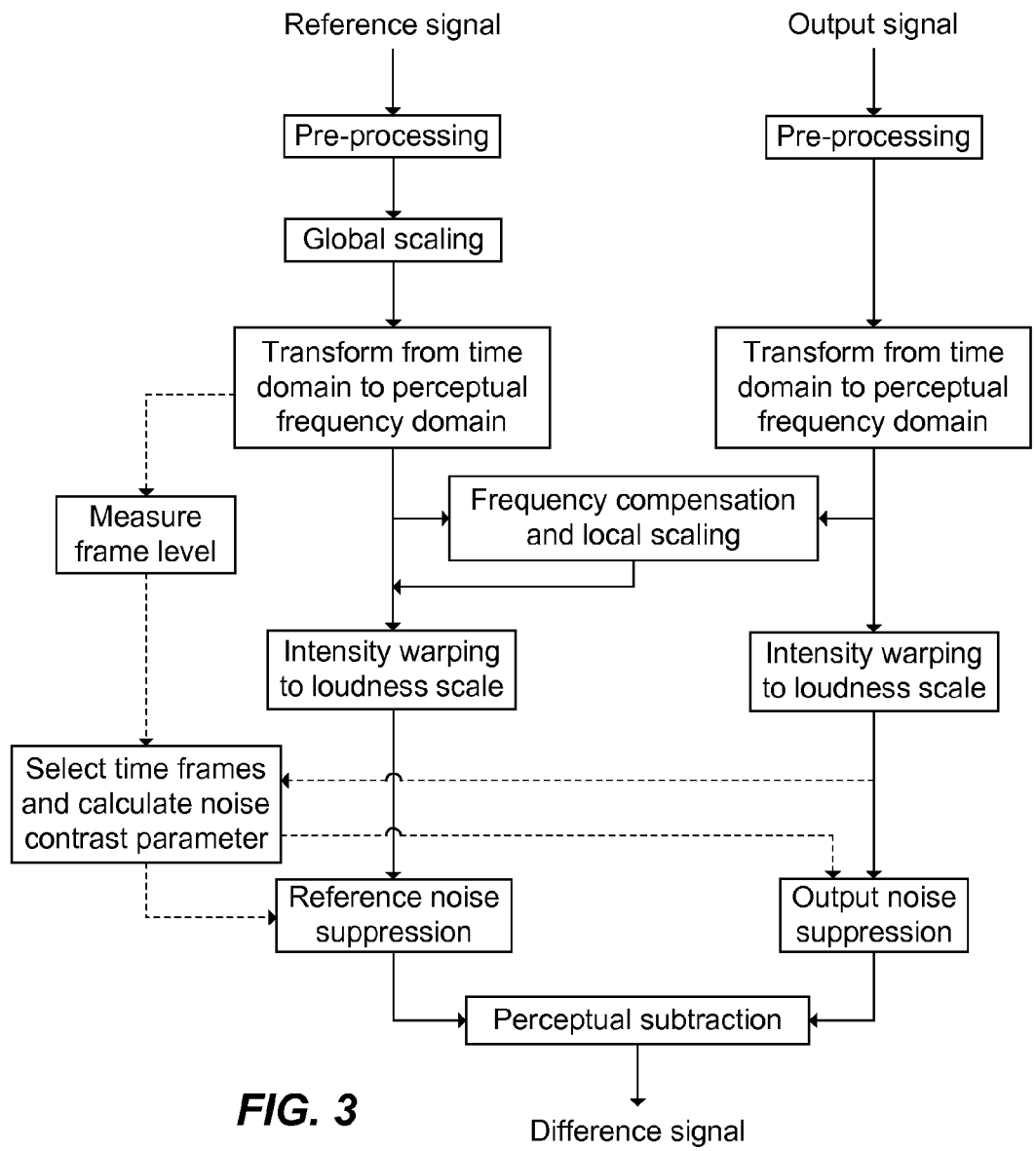
FIG. 3 schematically shows a method determining a quality indicator representing a perceived quality of an output signal of an audio device with respect to a reference signal according to an embodiment of the present invention.

FIG. 3 schematically shows determining a quality indicator representing a perceived quality of an output signal of an audio device with respect to a reference signal according to an embodiment of the present invention. After pre-processing actions like IRS-filtering and time delay, the reference signal and the output signal are transformed from the time domain to the perceptual frequency domain. This may be accomplished in a way similar as shown in FIG. 2 with reference to PESQ. That is, first a windowing function is executed in combination with an FFT to bring the signal from the time domain into the time-frequency domain. After the FFT, the signals are warped to a pitch scale, e.g. a frequency scale in Bark, to obtain a representation in the perceptual frequency domain.

Additionally, the reference signal is globally scaled to a fixed intensity level. This scaling action may be performed before the transformation, as shown in FIG. 3, but may also be performed in the (perceptual) time-frequency domain.

Within the perceptual time-frequency domain, further referred to as perceptual frequency domain, the scaled reference signal may be subject to frequency compensation as described with reference to FIG. 2. Similarly, the output signal may be subject to a local scaling action. The local scaling may also be performed with respect to the reference signal as schematically shown in FIG. 3. Both the scaled reference signal and the output signal are then subjected to intensity warping to the loudness scale as discussed with reference to PESQ shown in FIG. 2. The reference signal and output signal are now represented in the perceptual loudness domain.

In addition to all aforementioned actions, which may all be present in some way in a PESQ-based method as shown in FIG. 2, the method of determining a quality indicator according to embodiments of the invention also includes measuring the intensity level of time frames within the scaled reference system, hereafter also referred to as frame level detection or frame level measurement. In the frame level detection action, a parameter related to the intensity level of the time frames within the scaled reference signal is determined. Such intensity level parameter may for example correspond to an average intensity level per time frame or a measured peak intensity level per frame.

The determined intensity level parameters of the time frames within the scaled reference signal are used to select time frames within the output signal to be included in the one or more calculations in view of noise suppression. In an embodiment of selection, time frames within the scaled reference signal are identified for which the intensity value lies below a certain value, hereafter referred to as silence criterion value. A time frame within the scaled reference signal for which the intensity value lies below the silence criterion value will be referred to as silent frame. Selected time frames within the output signal correspond to the silent frames within the scaled reference signal. Preferably, the selection process progresses by identifying a series of consecutive silent frames, e.g. 8 silent frames. Such series of consecutive silent frames will hereafter be referred to as a silent interval. The measured intensity level within silent frames, and in particular silent frames within a silent interval, expresses a noise level that is inherently present in the reference signal under consideration. In other words, there is no influence of the device under test.

The calculations in view of noise suppression include the calculation of a noise contrast parameter. The noise contrast parameter is a measure of the noise contrast within a portion of the signal. The noise contrast parameter may be used to control a noise suppression of at least one of the reference and output signal within the perceptual loudness domain.

The noise contrast parameter calculation may comprise selecting a pair of time frames within the output signal that corresponds to silent frames within a silent interval. For example, a pair of time frames within the output signal may be selected that corresponds to the first and fourth time frame in a silent interval of 8 consecutive time frames. After this selection, a fraction parameter may be determined based on the intensity levels of the selected two time frames.

In an embodiment, the intensity level value of a first selected time frame of the selected pair of time frames within the output signal is divided by the second time frame of the pair, or vice versa, to obtain the fraction parameter. In another embodiment, the fraction parameter, FP, may be obtained by a similar division followed by a compression action, e.g. by using a power, i.e.

$$FP = \left(\frac{Powerselectedframe1 + \text{delta}}{Powerselectedframe2 + \text{delta}}\right)^\alpha \quad (2)$$

Power coefficient $\alpha$ may for example be about 0.35 and parameter delta, which is used to avoid a division by zero, may for example be about 0.2.

The noise contrast parameter may then be defined as being substantially equal to the fraction parameter FP if Powerselectedframe1 represents the power or intensity level of the first selected frame. The noise contrast parameter then quantifies jumps from lower to higher levels of background noise.

The example of the calculation of a noise contrast parameter according to an embodiment of the invention discussed above is further clarified by the C-program code provided below:

```
noiseContrastMax = 1.0;
for (frame = start; frame <= stop; frame++) {
    if ( originalSilent[frame] && originalSilent[frame+1] &&
```

```
    originalSilent[frame+2] &&
    originalSilent[frame+3] && originalSilent[frame+4] &&
    originalSilent[frame+5] &&
    originalSilent[frame+6] && originalSilent[frame+7] ) {
    hulp1 = aDistortedLoudness [frame]+0.2;
    hulp2 = aDistortedLoudness [frame+3]+0.2;
    if (hulp1>1.5) hulp1 = 1.5;
    if (hulp2>1.5) hulp2 = 1.5;
    hulpRatio = (hulp2)/(hulp1);
    hulp1 = pow(hulpratio,0.35);
    if ( (hulp1>noiseContrastMax) ) noiseContrastMax = hulp1; } }
```

In this program, the noise contrast parameter relates to the maximum noise contrast referred to as noiseContrastMax. Additionally, originalSilent[frame] relates to a silent frame within the reference signal (frame being the first frame of a silent interval of 8 silent frames and frame+7 being the last silent frames of this silent interval), and aDistortedLoudness refers to the loudness level of the output signal within the selected frame corresponding to a frame within the silent interval defined with reference to the reference signal. In this example, the power coefficient referred to as α in equation (2) equals 0.35, while parameter delta in equation (2) equals 0.2.

Furthermore, in this example, the noise contrast parameter equals a predetermined fixed value (i.e. 1.0) if the compressed fraction (hulp1 as defined in the one but last line) is below the predetermined fixed value. If the compressed fraction exceeds the predetermined fixed value, the noise contrast parameter equals the compressed fraction. In an embodiment, the maximum contrast over all silent intervals is searched for.

In comparison to state of the art methods for determining a quality indicator, for example PESQ schematically shown in FIG. 2, the method schematically shown in FIG. 3 further includes one or more noise suppression actions. The noise suppression algorithm that is used in such noise suppression actions includes the use of the noise contrast parameter. The noise suppression actions may be performed on the scaled reference signal as well as on the output signal. In the embodiment shown in FIG. 3, in the perceptual loudness domain, the scaled reference signal and the output signal are subjected to a reference noise suppression and an output noise suppression action respectively.

The reference noise suppression may comprise calculating a reference average noise spectral density over a number of time frames based on the intensity level measurements performed in the frame level detection action. As mentioned earlier, preferably data related to time frames belonging to a silent interval are used to obtain the reference average noise spectral density. In case of testing a device handling speech signals, the use of silent intervals ensures that there is a minimal influence of speech on the reference average noise spectral density. Additionally, a reference noise suppression factor may be determined by optimizing the correlation between objective and subjective quality assessment experiments. The reference noise suppression factor so determined is believed to represent an ideal level of noise reduction in order to obtain an ideal low noise level for constructing an ideal reference signal. Generally, this level will be very low, e.g. about 20 to 30 dB SPL in the case of steady state pink like noise. The reference noise suppression factor generally has a value between 0.2 and 0.6.

The reference noise suppression performed on the scaled reference signal allows suppression of the noise up to a noise level that is considered to be a desirable low noise level. In an embodiment, the reference noise suppression factor, the average reference noise spectral density and the noise contrast parameter are used to calculate the desired low noise level. In an embodiment the intensity level of the scaled reference signal in the perceptual frequency domain is lowered by multiplying the average reference noise spectral density with the reference noise suppression factor divided by the noise contrast parameter.

In a C-program, the noise suppression with respect to the reference signal may look like the following:

```
factorReference = factorReference/noiseContrastMax;
for (nu = 0; nu < aNumberOfBands; nu++) {
    for (frame = start; frame <= stop; frame++) {
        PitchPowerDensityReference[frame][nu] -=
            factorReference*AverageSpectrumReferenceOverSilentReference[nu];
        if (PitchPowerDensityReference[frame][nu] < 0.0)
            PitchPowerDensityReference[frame][nu] = 0.0; } }
```

The output noise suppression may comprise calculating an average output noise spectral density over a number of time frames. The average output noise spectral density is preferably calculated over frames corresponding to silent frames belonging to a silent interval in the scaled and time-aligned reference signal for similar reasons as discussed with reference to the reference noise level suppression.

Additionally, a low noise level constant and an output noise suppression factor are determined. The low noise level constant corresponds to a low noise level that appears to be always present and does not influence the quality perception of a signal. In order to quantify noise impact, this low noise level is excluded from the noise suppression. The function of the output noise suppression factor is similar to the function of the reference noise suppression factor discussed with reference to the scaled reference signal. Both the low noise level constant and the output noise suppression factor may be determined via optimization of the correlation between objective and subjective quality assessment experiments.

The output noise suppression performed on the output signal can be arranged to suppress noise up to a noise level representative of the disturbance. The output noise suppression may be frequency dependent.

The noise level representative of disturbance in the output signal can be calculated by using the low noise level constant, the output noise suppression factor and the average output noise spectral density in combination with the noise contrast parameter. The noise contrast parameter may be used to adapt the value of the low noise level constant to compensate for noise contrast differences, for example by multiplication of the low noise level constant with the noise contrast parameter. Similarly, the output noise suppression factor may be adapted by division by the noise contrast parameter.

In an embodiment the intensity level of the output signal in the perceptual frequency domain is lowered by the average reference noise spectral density minus the adapted low noise level constant multiplied with the adapted output noise suppression factor.

An exemplary C-program showing such embodiment of the noise suppression algorithm with respect to the output signal is given below:

```
constantDistorted = constantDistorted *noiseContrastMax;
factorDistorted = factorDistorted/noiseContrastMax;
bandLow = 2.0; bandHigh = 20.0;
for (nu = 0; nu < aNumberOfBands; nu++) {
    hulp1 = 1.0; hulp2 = 1.0;
    if (centreBark [nu]<bandLow) hulp1=(5.0-2.0*centreBark [nu]);
    if (centreBark [nu]>bandHigh) hulp2=(1.0+0.07*(bandHigh-centreBark[nu]));
    hulp = AverageInputSpectrumDistortedOverSilentReference[nu]-constantDistorted*hulp2;
       if (hulp<0.0) hulp = 0.0;
    hulpPow = 0.8*pow((AverageSpectrumDistortedOverSilentReference[nu]+1.0),0.03);
    If (hulpPow>1.2) hulpPow=1.2;
    for (frame = start; frame <= stop; frame++) {
       PitchPowerDensity[frame][nu] -= factorDistorted*hulp*hulpPow*hulp1;
       if (PitchPowerDensityDistorted[frame][nu]<0.0)
          PitchPowerDensityDistorted[frame][nu]=0.0; } }
```

Finally, the reference signal and output signal may be perceptually subtracted. This can be done in a way known from PESQ and discussed with reference to FIG. 2. That is, an indicator representative of the overall degradation, $D_n$, and an indicator representative of added degradations, $DA_n$, are determined in parallel.

The scheme as shown in FIG. 3 allows for a different approach regarding calculation of both indicators. It is possible to perform the method as shown in FIG. 3 twice, i.e. one time for determining a quality indicator representing quality with respect to overall degradation, the other time for determining a quality indicator representing quality with respect to degradations added in comparison to the reference signal. Performing the method twice enables optimization of calculations with respect to different types of distortions. Such optimization may considerably improve the correlation between an objectively measured speech quality and a speech quality as obtained in subjective listening quality experiments.

For example, silent intervals used for determining the quality indicator for the overall degradation may be determined differently than silent intervals used for determining the quality indicator for the added degradation. In particular, the threshold value used to identify silent intervals for the overall degradation, which may be referred to as first threshold value, may be lower than the threshold value used to identify silent intervals used for the added degradation. The latter threshold value may be referred to as second threshold value. Silent interval time frames qualified with respect to the first threshold value may be denoted as super silent frames, while the silent interval time frames qualified with respect to the second threshold value may be denoted as silent frames.

Using embodiments of the method of the invention in accordance with the method shown in FIG. 3 provides a significant increase in correlation between an objectively measured speech quality and the speech quality as obtained in subjective listening quality experiments.

Figure 4:
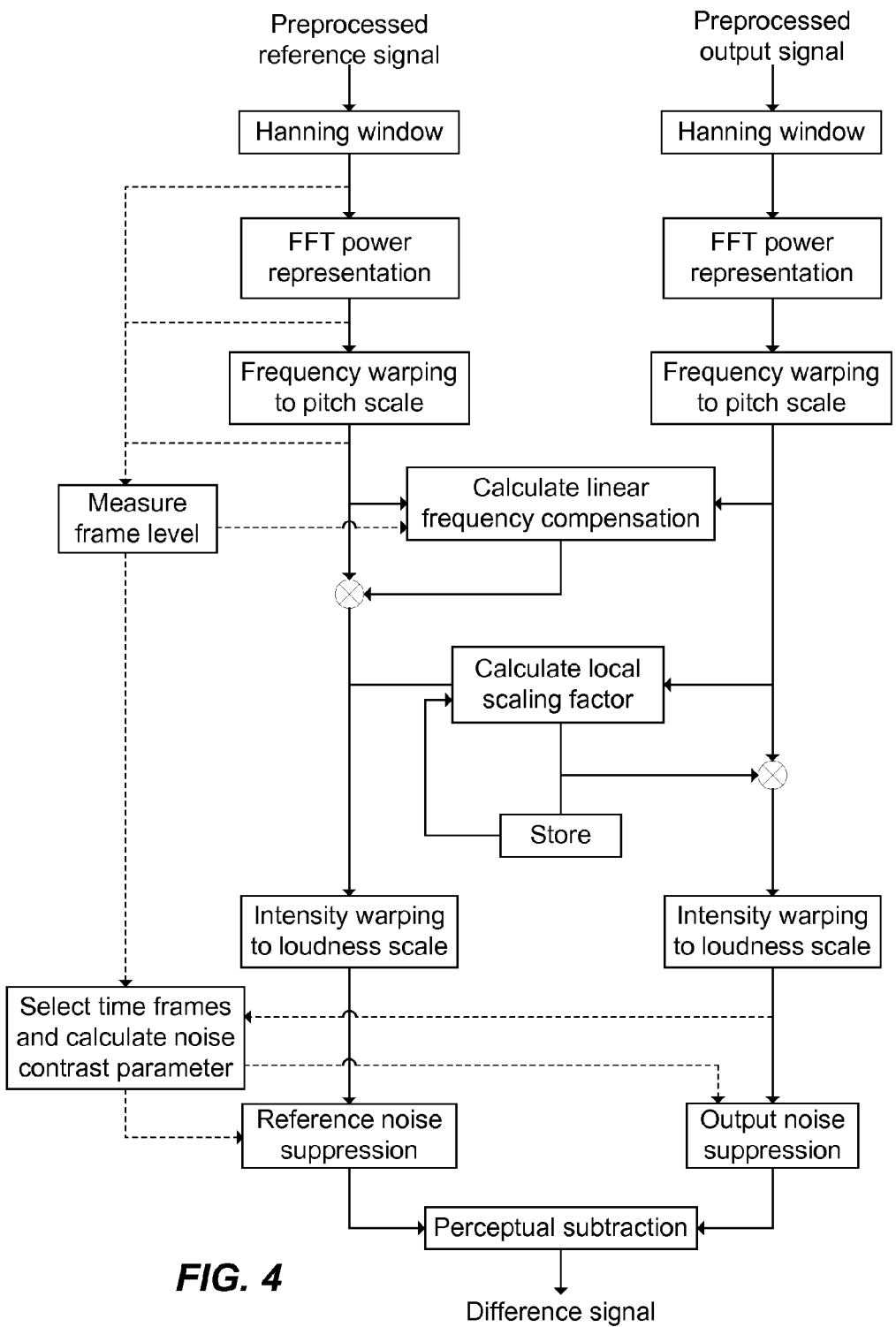
FIG. 4 schematically shows an embodiment of the present invention applied to the method shown in FIG. 2.

FIG. 4 schematically shows an embodiment of the present invention applied to the method shown in FIG. 2. After pre-processing, i.e. level alignment, IRS filtering, and time delay identification and adaptation, the reference signal and the output signal are subject to the windowing function, fast Fourier transformation and frequency warping to the pitch scale to accomplish transformation from the time domain towards a time frame representation in the perceptual frequency domain. Frame level detection with respect to the reference signal as described with reference to FIG. 3 may be performed on the reference signal anywhere along this domain transformation, schematically shown by the dotted lines. As a result of the frame level detection, time frames can be identified with an intensity level value exceeding a certain threshold value, hereafter referred to as speech activity criterion value. These time frames may be used in the calculation of linear frequency compensation of the reference signal. Furthermore, after intensity warping of the reference pitch power density function and the output pitch power density function to the loudness scale to obtain a reference loudness density function and an output loudness density function respectively, both loudness density function may be subjected to a noise suppression action based on a noise contrast parameter as described with reference to FIG. 3. As a result of the noise suppression, the impact of noise on speech quality may be more accurately modeled, and predictions of the perception of the signal to be processed, e.g. a speech signal, may improve.

Figure 5:
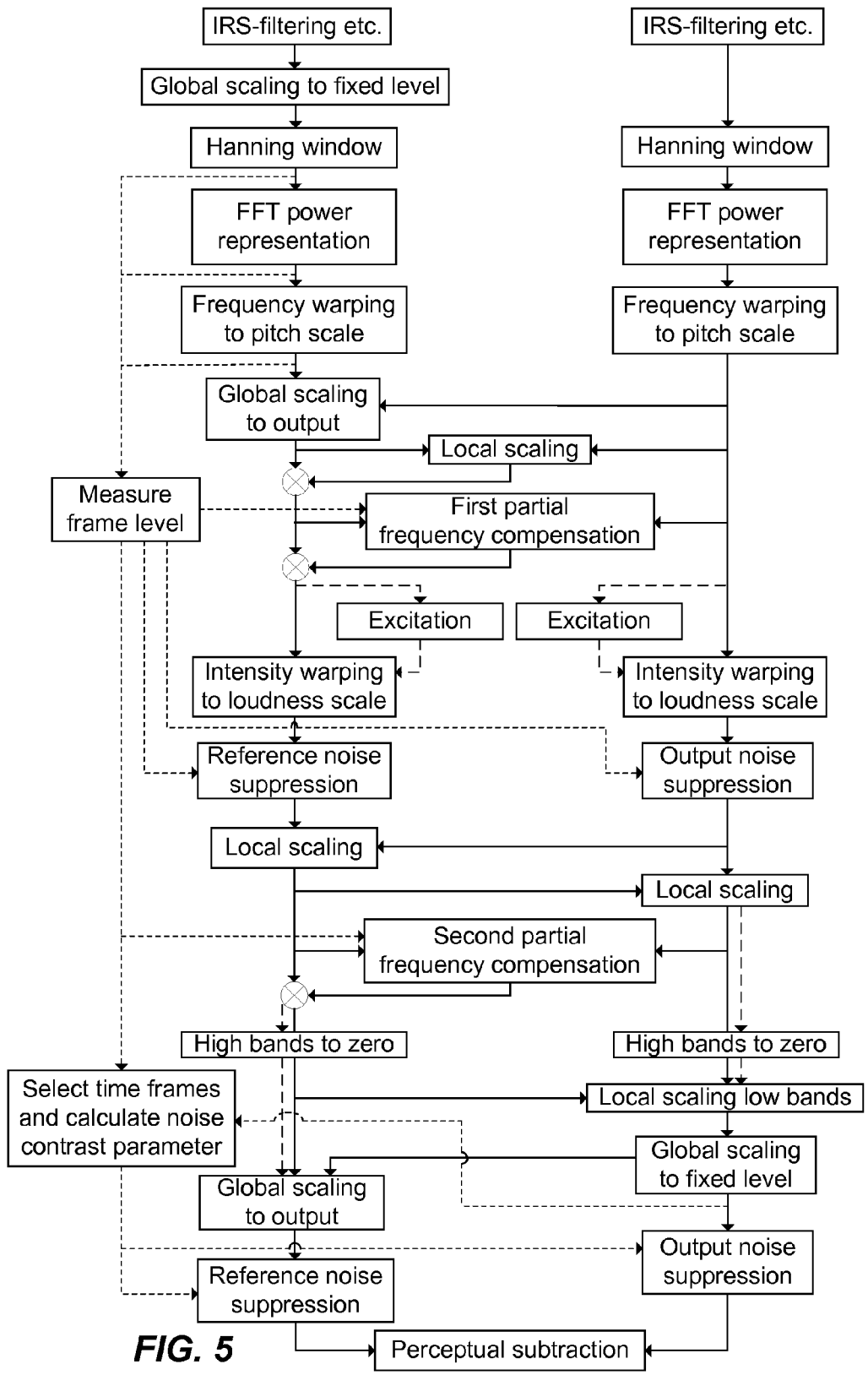
FIG. 5 schematically shows an embodiment of the present invention applied to an other method.
Figure 6A:
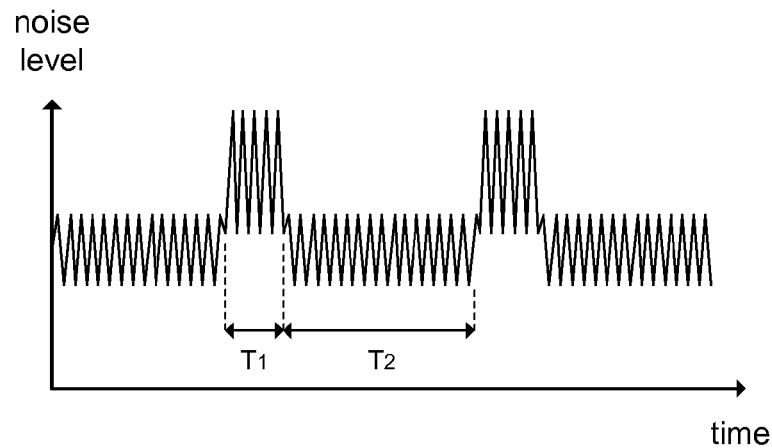
FIGS. 6A-6F show different graphs of noise level as a function of time.
Figure 6B:
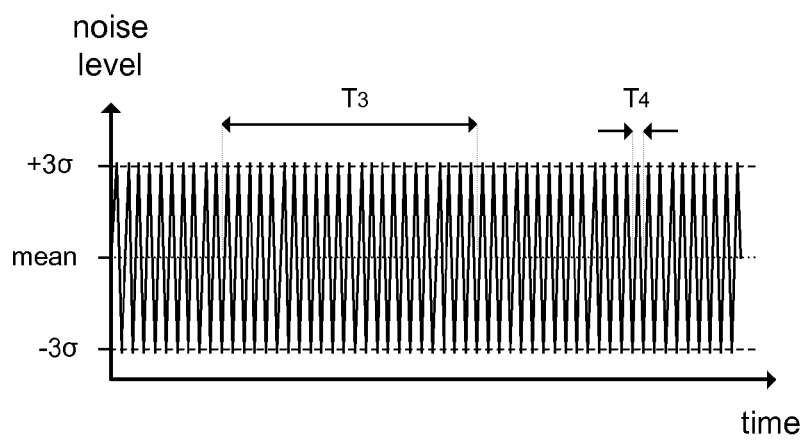
Figure 6C:
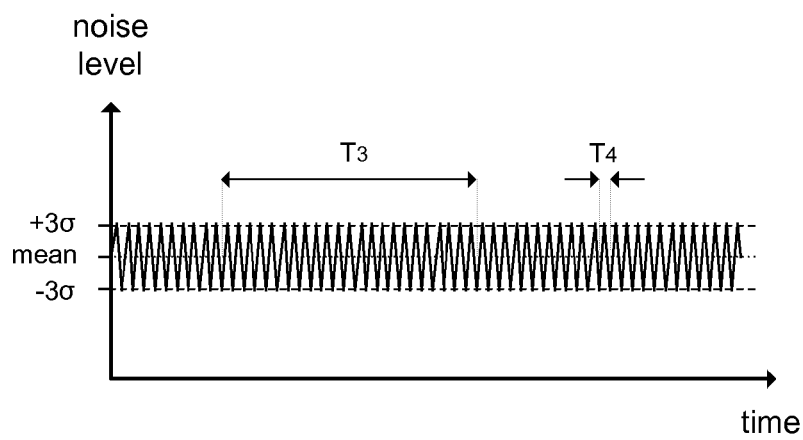
Figure 6D:
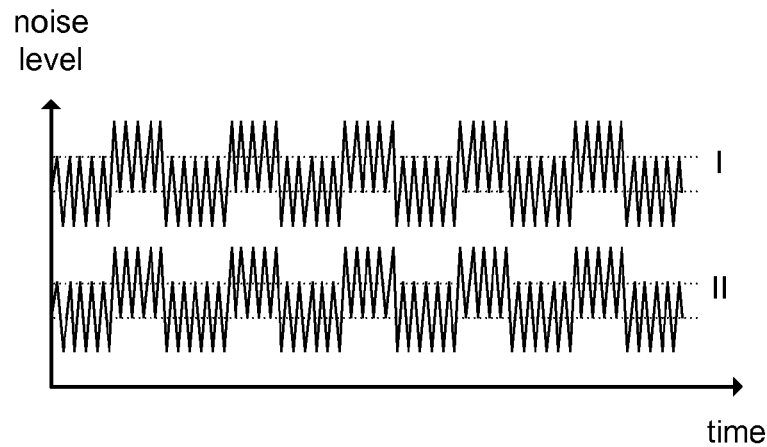
Figure 6E:
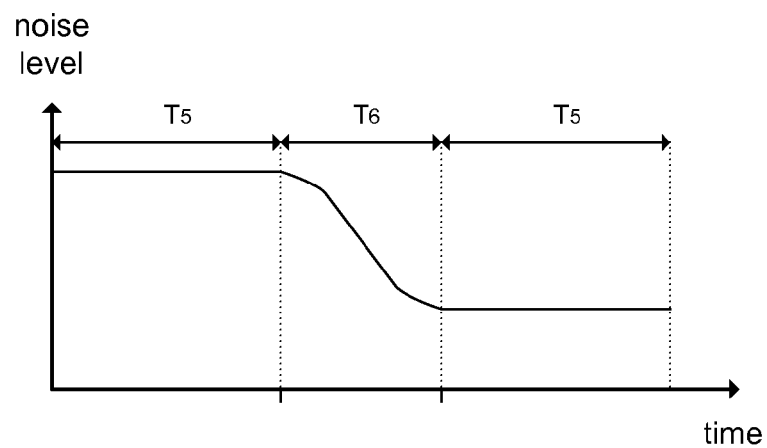
Figure 6F:
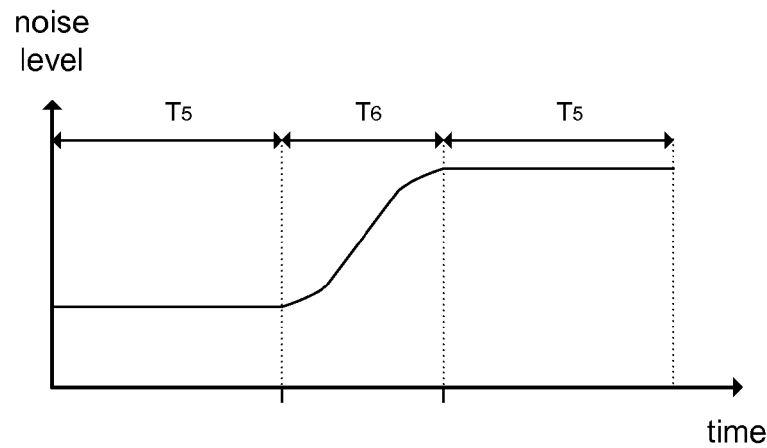

FIG. 5 schematically shows an embodiment of the present invention applied to another method of determining a quality indicator representing a perceived quality of an output signal of an audio device with respect to a reference signal. In this embodiment, intensity level variations are taken into account. For this reason, the output signal is not subject to a level alignment action.

The reference signal and the output signal do undergo pre-processing steps like IRS-filtering and time delay as used in PESQ. Furthermore, in order to use frame level detection, the reference signal is subject to a global scaling action, which scales the reference signal towards a fixed intensity level. The fixed intensity level preferably coincides with a level of about 73 dB SPL for a diotically or dichotically presented speech fragment and with a level of about 79 dB SPL for a monotically presented speech fragment.

Along the different steps in the process of transforming the reference signal and output signal from the time domain towards a representation in time frames in the perceptual frequency domain, intensity detection of the time frames may be performed in a way as described with respect to FIG. 3 and similar as used in the PESQ-related embodiment shown in FIG. 4. That is, first the signals are divided in time frames by using a windowing function, e.g. a Hanning window, followed by a FFT towards the time-frequency domain.

After the frame level measurements, also referred to as frame level detection, the scaled reference signal is scaled towards an intensity level related to the output signal. This global scaling action may use an algorithm that only partially compensates for the intensity level difference between the reference signal and the output signal. The difference that is left can be used to estimate the impact of intensity level on perceived transmission quality.

After the global scaling towards the intensity level of the output signal, the reference signal is subject to a local scaling in the perceptual frequency domain and a partial frequency compensation using the same approach as discussed with reference to PESQ in FIG. 2. Although in the embodiment shown in FIG. 5 the local scaling is performed with reference to the reference signal, it is equally well possible to apply this local scaling step with respect to the output signal, e.g. in a way as shown in FIG. 2. The object of the local scaling action relates to compensation of short-term gain variations. Whether the reference signal or the output signal is to be selected may depend on the specific application, In general, the reference signal is compensated, because the reference signal is never presented to a test subject in subjective quality measurements.

In an embodiment, the first partial frequency compensation uses a so-called soft scaling algorithm. In the soft scaling algorithm, the signal to be treated, i.e. either the reference signal or the output signal, is improved by scaling in such a way that small deviations of power are compensated, preferably per time frame, while larger deviations are compensated partially, in dependence of a power ratio between the reference signal and the output signal. More details with respect to the use of soft scaling can be found in US-patent application 2005/159944, U.S. Pat. Nos. 7,313,517, and 7,315,812, all assigned to the applicant and herewith incorporated by reference.

Preferably, an excitation step is now performed on both the reference signal and the output signal to compensate for smearing of frequency components as a result of the earlier execution of the fast Fourier transform with windowing function with respect to these signals. More details with respect to excitation performed on signals for this purpose can for example be found in the article "A perceptual Audio Quality Measure Based on a Psychoacoustic Sound Representation", by J. G. Beerends and J. A. Stemerdink, J. Audio Eng. Soc., Vol. 40, No. 12 (1992) pp. 963-978. In this article, the excitation is calculated and quality is determined by using smeared excitation representations. In an embodiment, the calculated excitation is then used to derive a self masking curve that in its turn can be used to get a sharpened time-frequency representation. In its simplest form, the self masking curve corresponds to a fraction of the excitation curve.

After an intensity warping to loudness scale as used in PESQ, and described with reference to FIG. 2, the reference signal and the output signal are scaled locally in the loudness domain. Firstly, those parts of the reference signal are scaled that are louder than the output signal. Then portions of the output signal that are louder than the reference signal are scaled.

The separation of these local scaling actions allows for separate implementation and/or manipulation of level variations due to time clipping and pulses. If a portion of the reference signal is louder than a corresponding portion of the output signal, this difference may be due to time clipping, e.g. caused by a missing frame. In order to quantify the perceptual impact of time clipping, the reference signal is scaled down to a level that is considered to be optimal for the (asymmetric) disturbance difference calculation. This local scaling action on the output signal also suppresses noise in the output signal up to a level that is more optimal for the (asymmetric) disturbance difference calculation. The impact of noise on the subjectively perceived quality can be more accurately estimated by combining this local scaling with a noise suppression action on the output signal.

Next, a second partial frequency compensation is carried out. The second partial frequency compensation may be performed in a similar way as in PESQ, however, now being used in the loudness domain. In an embodiment, the second partial frequency compensation uses a soft scaling algorithm as discussed earlier with reference to the first partial frequency compensation.

Both the first partial frequency compensation and the second partial frequency compensation may use results of the frame level detection that is carried out on the reference signal. In an embodiment, the first and second partial frequency compensations may use an estimation of linear frequency response of the system under test based on all frames for which the input reference signal value is greater than a threshold value, e.g. a speech activity criterion value. This threshold value may correspond to an absolute hearing threshold.

Preferably, at this point, high bands of both reference signal and output signal are set to zero because they turn out to have a negligible influence on the perceived transmission quality to be determined. Additionally, the intensity levels of the low bands of the output signal are locally scaled towards the intensity levels of similar bands of the reference signal. For example, all bands related to Bark 23 and higher may be set to zero, while Bark bands in the output signal related to Bark 0 to 5 may be scaled. Bark bands related to Bark 0-22 in the reference signal and Bark bands related to Bark 6 to 22 in the output signal are then not subject to either one of these operations.

Up to this point, signal levels of the output signal have not been changed significantly, and very low levels of the output signal will now cause only marginal differences in the internal representation. This leads to errors in the quality estimation.

For this purpose, first the loudness level is scaled to a fixed loudness level, also referred to as the fixed internal loudness level. If a starting global level calibration is used for the reference signal as described in the ITU-T Recommendations P.861 and/or P.862, such fixed global internal level lies around 20, a dimensionless internal loudness related scaling number. Secondly, the levels of the reference signal are scaled towards the corresponding levels of the output signal.

As a result of the loudness level scaling of the output signal, the loudness level difference between the output signal and the reference signal is such that no reliable quality indicator can be determined. To overcome this undesirable prospect, the loudness level of the reference signal needs to be scaled as well. Therefore, following the scaling of the loudness level of the output signal, the reference signal is globally scaled towards a loudness related to the scaled output signal. Now both the reference signal and the output signal have a loudness level that can be used to calculate the perceptually relevant internal representations needed to obtain an objective measure of the transmission quality of an audio system.

In some embodiments, the global scaling actions in the loudness domain use information obtained in the frame level detection action. For example, the scaling may only be performed on time frames for which the intensity level exceeds a certain threshold value, e.g. the speech activity criterion value.

Finally, similarly to the method described with reference to FIG. 2, the reference signal and output signal are subtracted resulting in a difference signal. After the perceptual subtraction, a perceived quality measure can be derived, e.g. in a way as shown in FIG. 2 and described in ITU-T Recommendation P.862.

However, in contrast to PESQ as described in ITU-T Recommendation P.862, some embodiments of the invention, including the embodiments shown in FIGS. 3-5 may be performed twice. One time to determine a quality indicator representative of all degradations, and the other time to determine a quality indicator representative of the degradations added in comparison to the reference signal. Such procedure has been discussed in more detail with reference to FIG. 3.

In the embodiment shown in FIG. 5, noise suppression of the reference signal and the output signal is introduced at two different stages in the method. First, after intensity warping to the Sone loudness scale, the reference signal may be subject to a noise suppression for suppressing noise up to a predetermined noise level. Similarly, the output signal may be subject to a noise suppression action. In this case, the noise suppression may be arranged for suppressing noise up to a noise level representative of the disturbance experienced by the user of the device under test, e.g. audio system 10 in FIG. 1. More details with respect to these noise suppression actions have been discussed with reference to FIG. 3.

Secondly, both the reference signal and the output signal may further be subjected to an additional noise suppression action after global scaling. It has been found that such additional noise suppression after global scaling further improves the correlation between an objectively measured speech quality and the speech quality as obtained in subjective listening quality experiments.

Embodiments of the noise suppression actions may be similar to the noise suppression actions described earlier with reference to FIG. 3. The parameters, in particular the reference noise suppression factor, the output noise constant and the coupling of the noise contrast parameter may be different to obtain optimal results.

The method of determining the transmission quality of an audio system as presented with reference to FIG. 5 provides more accurate predictions in case the audio system operates at varying listening intensity levels as a result of the introduction of a number of global scaling steps. The noise suppression steps, as mentioned earlier, enables an improved prediction of the impact of noise on speech quality as this impact varies in dependence of local signal level.

The invention has been described by reference to certain embodiments discussed above. It will be recognized that these embodiments are susceptible to various modifications and alternative forms well known to those of skill in the art.

The invention claimed is:

1. A method for determining a quality indicator representing a perceived quality of an output signal of an audio device with respect to a reference signal, the method comprising:
processing and comparing the reference signal and the output signal wherein the processing includes dividing the reference signal and the output signal into mutually corresponding time frames, wherein the processing further comprises:
scaling the reference signal towards a fixed intensity level;
selecting time frames of the output signal based on measurements performed on the scaled reference signal;
calculating a noise contrast parameter based on the selected time frames of the output signal, the noise contrast parameter being a measure of the noise contrast within the signal; and
applying a noise suppression on at least one of the reference signal and the output signal in the perceptual loudness domain based on the noise contrast parameter.

2. The method of claim 1, wherein calculating the noise contrast parameter comprises:
determining a fraction by dividing the intensity value of a first selected time frame within the output signal by the intensity value of a second selected time frame within the output signal; and
compressing the fraction by using a power law with a predetermined compression coefficient so as to obtain the noise contrast parameter.

3. The method of claim 2, wherein the noise contrast parameter is set to a predetermined fixed value if the compressed fraction is below the predetermined fixed value.

4. The method of claim 1, wherein applying the noise suppression on the reference signal comprises:
calculating a reference average noise spectral density over a number of time frames having a detected intensity level below a threshold value;
determining a reference noise suppression factor based on an optimized correlation between objective and subjective quality assessment information; and
calculating a desired noise level based on the reference noise suppression factor and the reference average noise spectral density.

5. The method of claim 1, wherein applying the noise suppression on the output signal comprises:
calculating an average output noise spectral density over a number of time frames corresponding to time frames within the reference signal having a detected intensity level below a threshold value;
determining a low noise level constant based on an optimized correlation between objective and subjective quality assessment information;
determining an output noise suppression factor based on an optimized correlation between objective and subjective quality assessment information; and
calculating a noise level representative of disturbance in the output signal by using the low noise level constant, the output noise suppression factor and the average output noise spectral density.

6. The method of claim 1, wherein the processing further comprises:
transforming the reference signal and the output signal from the time domain towards the time-frequency domain;
deriving a reference pitch power density function from the reference signal and deriving an output pitch power density function from the output signal;
locally scaling the reference pitch power density function to obtain a locally scaled reference pitch power density function;
partially compensating either the output pitch power density function or the locally scaled reference pitch power density function with respect to frequency; and
deriving a reference loudness density function and an output loudness density function.

7. The method of claim 6, wherein the processing further comprises:
scaling the intensity of the reference pitch power density function from the fixed intensity level towards an intensity level related to output pitch power density function to obtain an intensity level difference between the pitch power density functions that allows for quantification of the impact of intensity level on the perceived quality;
scaling the loudness of the output loudness density function towards a fixed loudness level in the perceptual loudness domain; and
scaling the loudness of the reference loudness density function from a loudness level corresponding to the output related intensity level towards a loudness level related to the loudness level of the output loudness density function in the perceptual loudness domain, to obtain a loudness level difference between the reference loudness density function and the output loudness density function that allows for quantification of the impact of loudness on the perceived quality of the output signal.

8. A method for determining two quality indicators representing a perceived quality of an output signal of an audio device with respect to a reference signal, the method comprising:
performing the method according to claim 1 for determining a first quality indicator representing quality with respect to overall degradation; and
performing the method according to claim 1 for determining a second quality indicator, the second quality indicator representing quality with respect to degradation added in comparison to the reference signal.

9. The method of claim 8, wherein determining a first quality indicator comprises identifying a sequence of time frames within the scaled reference signal having a detected intensity level below a first threshold value, and determining a second quality indicator comprises identifying a sequence of time frames within the scaled reference signal having a detected intensity level below a second threshold value, the second threshold value being greater than the first threshold value.

10. The method of claim 8, wherein selecting time frames comprises selecting time frames of the output signal corresponding to time frames of the scaled reference signal that satisfy a predetermined condition.

11. The method of claim 10, wherein said predetermined condition includes that the time frame of the scaled reference signal, a silent frame, has an intensity level value below a threshold value.

12. The method of claim 11, wherein said predetermined condition further includes that the time frame of the scaled reference signal is part of a series of consecutive silent frames, a silent interval.

13. The method as recited in claim 1, further comprising perceptually subtracting the reference signal and the output signal to form a difference signal and deriving the quality indicator from the difference signal.

14. A system for determining a quality indicator representing a perceived quality of an output signal of an audio system with respect to an input signal of the audio system which serves as a reference signal, the system comprising:
a memory configured to store program instructions; and
a processor capable of executing the program instructions to:
pre-process the reference signal and the output signal, wherein pre-processing the reference signal comprises scaling the reference signal towards a fixed intensity level;
process the reference signal and the output signal to obtain representation signals for the reference signal and the output signal respectively, wherein processing the reference signal and the output signal comprises:
selecting time frames of the output signal based on measurements performed on the scaled reference signal;
calculating a noise contrast parameter based on the selected time frames of the output signal, the noise contrast parameter being a measure of the noise contrast within the signal; and
applying a noise suppression on at least one of the reference signal and the output signal in the perceptual loudness domain based on the noise contrast parameter;
combine the representation signals of the reference signal and the output signal so as to obtain a differential signal; and
process the differential signal to obtain a quality signal representing an estimate of the perceptual quality of a speech processing system.

15. A non-transitory computer readable medium having stored thereon software instructions that, if executed by a processor, cause the processor to perform operations comprising the method steps according to claim 1.

* * * * *